(12) United States Patent
Halt et al.

(10) Patent No.: US 6,343,301 B1
(45) Date of Patent: Jan. 29, 2002

(54) METHOD AND SYSTEM FOR COLLECTING DATA FOR UPDATING A GEOGRAPHIC DATABASE

(75) Inventors: Gene Halt, Chicago; Kevin Cherveny, Wilmington, both of IL (US)

(73) Assignee: Navigation Technologies Corp., Chicago, IL (US)

(*) Notice: Subject to any disclaimer, the term of this patent is extended or adjusted under 35 U.S.C. 154(b) by 0 days.

(21) Appl. No.: 09/256,389

(22) Filed: Feb. 24, 1999

(51) Int. Cl.[7] .............................................. G06F 17/30
(52) U.S. Cl. .................. 707/203; 707/2; 707/8; 707/9; 709/227; 701/200; 701/201; 701/208
(58) Field of Search ................................. 707/201, 203, 707/101, 2, 8, 9; 709/227; 701/200, 201, 208

(56) References Cited

U.S. PATENT DOCUMENTS

| | | | |
|---|---|---|---|
| 5,214,757 A | | 5/1993 | Mauney et al. .............. 345/751 |
| 5,524,202 A | | 6/1996 | Yokohama ................. 707/104.1 |
| 5,948,040 A | * | 9/1999 | DeLorme et al. ............ 701/201 |
| 6,035,376 A | * | 3/2000 | James ......................... 711/145 |
| 6,047,234 A | * | 4/2000 | Cherveny et al. ........... 701/200 |
| 6,112,200 A | * | 8/2000 | Livshutz et al. ................ 707/4 |
| 6,121,924 A | * | 9/2000 | Meek et al. ............ 342/357.13 |
| 6,161,109 A | * | 12/2000 | Matamoros et al. ......... 707/203 |
| 6,173,277 B1 | * | 1/2001 | Ashby et al. .................... 707/1 |

* cited by examiner

*Primary Examiner*—Jack Choules
*Assistant Examiner*—Cheryl Lewis
(74) *Attorney, Agent, or Firm*—Frank J. Kozak; Lawrence M. Kaplan (57) ABSTRACT

A data collection method for a geographic database that represents geographic features in a region, and a system and program for performing the method. The data collection method includes obtaining a first copy of data from the geographic database without locking the data in the geographic database and performing an updating process using the first copy. A second copy of data from the geographic database is obtained. A determination is made whether application of the updating process to the second copy of data conflicts with any changes made to the geographic database since the first copy of data was obtained. If application of the updating process does not conflict with any changes made to the geographic database, the updating process is applied to the second copy of data from the geographic database. Then, the updated second copy of data is restored back in the geographic database.

40 Claims, 9 Drawing Sheets

METHOD AND SYSTEM FOR COLLECTING DATA FOR UPDATING A GEOGRAPHIC DATABASE

BACKGROUND OF THE INVENTION

The present invention relates to collecting data for a geographic database and more particularly, the present invention relates to a process and system for collecting data for updating a geographic database.

Geographic databases have various uses. Geographic databases are used in in-vehicle navigation systems, personal computers, networked computing environments, and various other kinds of platforms, as well as on the Internet. Geographic databases are used with various kinds of applications to provide various functions including map display, route calculation, route guidance, truck fleet deployment, traffic control, electronic yellow pages, emergency services, and so on.

In order to provide these kinds of functions, a geographic database includes data that represent geographic features in a covered geographic region. Geographic databases include details about represented geographic features, such as the geographic coordinates of roads in a geographic region, speed limits along the road segments, locations of stop lights, turn restrictions at intersections of roads, address ranges, street names, and so on. Geographic databases may also include information about points of interest in a covered region. Points of interest may include restaurants, hotels, airports, gas stations, stadiums, police stations, and so on.

Collecting information for a geographic database is a significant task. Not only is the initial collection of data a significant undertaking, but a geographic database needs to be updated on a regular basis. For example, new streets are constructed, street names change, traffic lights are installed, and turn restrictions are added to existing roads. Also, new levels of detail may be added about geographic features that are already represented in an existing geographic database. For example, an existing geographic database for roads may be enhanced with information about lane widths, shoulder sizes, lane barriers, sidewalks, bicycles paths, etc. Thus, there exists a need to continue to collect information for a geographic database.

According to one method, technicians (referred to herein as "researchers") are assigned the task of collecting data for a geographic database. Each researcher may physically travel throughout an assigned area and record information about observed geographic features. While in the field, the researcher may record the observed information by physically writing on a printed copy of a map. Computerized data collection techniques for certain types of data acquisition are also known. After the data are collected, the researcher uses a program that allows the researcher to make changes to a prime copy of the geographic database to reflect the actual geographic features observed by the researcher while out in the field.

Although this process works well, there exist room for improvement. For example, when the researcher is making the changes to the prime copy of the database, the data records in the database are locked. While the data records are locked, no other researcher can access or modify the same data records. This can cause inefficiencies when more than one researcher is collecting data for the same geographic area. Also, this method requires that changes observed in the field be separately entered at a later time when the researcher can access the geographic database.

Accordingly, it is desired to provide an improved method and system for collecting data for a geographic database.

SUMMARY OF THE INVENTION

To address these and other objectives, the present invention comprises a method, system, and/or programming for collecting data for a geographic database. The geographic database includes data that represents geographic features in a covered region. The data collection method includes obtaining a first copy of data from the geographic database without locking the data in the geographic database and performing an updating process using the first copy. When the updating process is complete, a second copy of data from the geographic database is obtained. A determination is made whether application of the updating process to the second copy of data conflicts with any changes made to the geographic database since the first copy of data was obtained. If application of the updating process does not conflict with any changes made to the geographic database, the updating process is applied to the second copy of data from the geographic database. Then, the updated second copy of data is restored (or copied) back in the geographic database.

According to another aspect, more than one researcher can obtain the data that represent the same geographic features and perform updating processes using the data at the same time.

According to yet another aspect, the updating process is performed by a researcher while in the field using the first copy of data.

DETAILED DESCRIPTION OF THE PRESENTLY PREFERRED EMBODIMENTS

I. Overview

Figure 1:
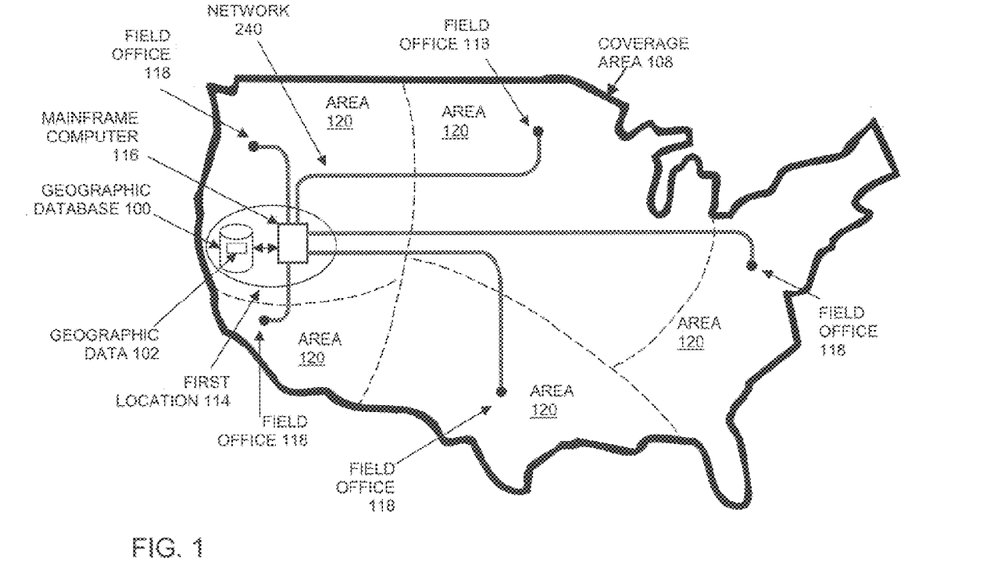
FIG. 1 is a diagram illustrating a coverage area in which a first embodiment of the present invention for updating a geographic database is used.

A first embodiment is described with reference to FIGS. 1 through 9C. FIG. 1 shows a primary version of a geographic database 100. The primary version of the geographic database 100 includes data 102 that represent geographic features in a coverage area 108. The coverage area 108 may correspond to an entire country, such as the United States.

Alternatively, the primary version of the geographic database 100 may correspond to several countries, such as the United States, Canada, and Mexico, or France, Germany, and Italy, and so on. According to another alternative, the primary version 100 may represent only a single region within a country, such as the West Coast or the Midwest of the U.S. The primary version of the geographic database 100 is maintained as the copy that has the most up-to-date data relating to the coverage area 108. Various processes may be used to confirm the integrity of the data in the primary version 100. (Although the geographic database 100 includes data that represent geographic features in the entire coverage area 108, there may be parts of the coverage area 108 that contain geographic features that are not represented by data in the geographic database, or for which the coverage is sparse.)

As stated above, the data 102 in the primary version of the geographic database 100 represent geographic features in the covered area 108. The data 102 include various attributes of the represented geographic features. For example, included in the primary version of the geographic database 100 are data that represent roads and data that represent attributes of roads, such as the geographic coordinates of positions on the roads, street names of the roads, addresses ranges along the roads, turn restrictions at intersections of roads, and so on. The geographic data 102 may also include information about points of interest in the covered geographic area 108. Points of interest may include hotels, restaurants, museums, stadiums, offices, automobile dealerships, auto repair shops, etc. The geographic data 102 may include data about the locations of these points of interests. The geographic data 102 may also include information about places, such as cities, towns, or other communities. The geographic data 102 may include other kinds of information.

The primary version of the geographic database 100 is updated, expanded, and/or otherwise modified on a regular and continuing basis. To facilitate these operations, the primary version of the geographic database 100 is preferably maintained in a format that facilitates updating and development. For example, the data in the primary version 100 may be stored in an uncompressed format. An example of a suitable format is the VSAM format, although other kinds of formats, both proprietary and non-proprietary, may be suitable.

A copy of the primary version 100 of the geographic database is physically located at a first location 114. In one embodiment, the primary version of the geographic database 100 is stored on one or more hard drives and accessed with a mainframe computer 116, such as an Amdahl or IBM mainframe computer. One or more backup copies are also maintained.

In one embodiment, the geographic data 102 are maintained and developed by Navigation Technologies Corporation of Rosemont, Ill. However, it is understood that the inventive concepts disclosed herein are not restricted to any particular source of data.

Figure 2:
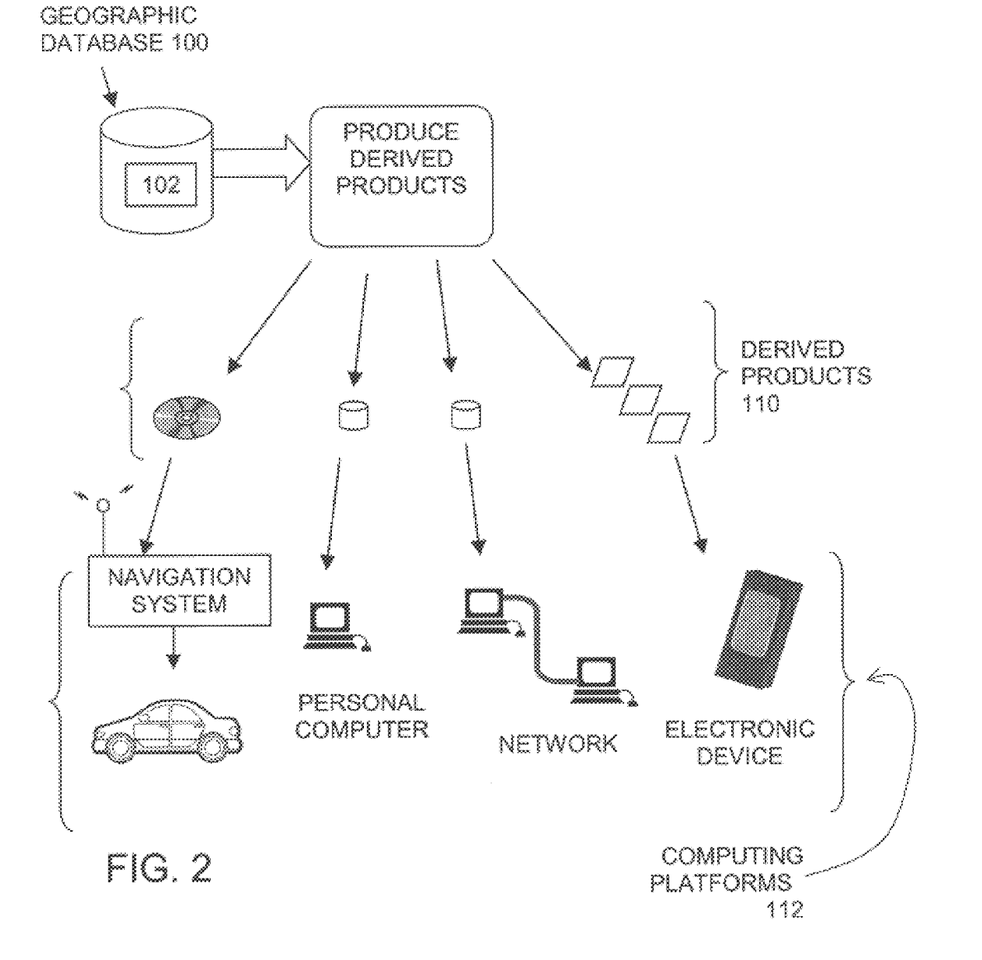
FIG. 2 is a diagram illustrating a process for forming derived database products from the primary version of the geographic database shown in FIG. 1.

As illustrated in FIG. 2, the primary version of the geographic database 100 is used to make derived database products 110. The derived database products 110 made from the primary version 100 may include only portions of all the data in the primary version 100. For example, the derived database products 110 may include data that relate to only one or more specific regions located within the coverage area 108 of the primary version 100.

The derived database products 110 are used by various applications. For example, the derived database products 110 may be used by applications that provide various functions, such as route calculation, route guidance, vehicle positioning, map display, and electronic yellow pages, as well as other kinds of functions. The derived database products 110 may be used on various kinds of computing platforms 112. For example, the derived database products 110 may be used in navigation systems (such as in-vehicle navigation systems and hand-held portable navigation systems), personal computers (including desktop and notebook computers), and other kinds of devices (such as PalmPilot®-type devices, pagers, telephones, personal digital assistants, etc.) Derived database products 110 may also be used on networked computing platforms and environments, including the Internet.

The derived database products 110 made from the primary version may be in a different format than the format in which the main copy 100 is maintained. The derived database products 110 may be in a format that facilitates the uses of the derived products in the platforms in which they are installed. The derived database products 110 may also be stored in a compressed format on the media on which they are located.

The derived database products 110 may be stored on media that are suitable for the hardware platforms in which they area installed. For example, the derived database products may be stored on CD-ROM disks, hard drives, DVD disks, flash memory, or other types of media that are available now or that become available in the future.

As mentioned previously, the primary version of the geographic database 100 includes the most up-to-date data relating to the coverage area 108. Processes are used to update, check, and expand the coverage of the data 102 in the primary version of the geographic database 100 on a regular basis. Expanding the coverage of the database includes adding data records to represent geographic features that had not already been represented by records in the geographic database. For example, within a coverage area (such as the area 108 in FIG. 1), there may be sub-areas that are not represented. Expanding the coverage of the database also includes adding data for new developments, e.g., new subdivisions. Expanding the coverage may also include adding more detail for areas that are already represented. In addition to expanding the coverage of the geographic database, there is a continuous need to update and check the existing data in the database. For example, speed limits may change, turn restrictions may change, etc.

Referring again to FIG. 1, the processes of updating, checking and expanding are performed by staff at one or more field offices 118. The field offices 118 are located in the geographic area corresponding to the coverage area 108 of the primary version of the geographic database. Each field office 118 may be associated with a separate portion 120 of the entire coverage area 108. Each field office 118 includes the appropriate hardware and software so that data can be exchanged between computing equipment located at the field office and the main computer 116. In one embodiment, the field offices 118 and the main computer 116 are connected with a data network 240. The network 240 may be a wide area network (WAN), the Internet, or any other kind of technology that enables the exchange of data between the main computer 116 and the field offices 118.

Each of the field offices 118 is staffed with one or more technicians (referred to herein as "researchers"). The researchers perform several functions. The researchers collect data for the primary database 100. The researches may add data about geographic features that had not previously been included in the primary database 100. The researchers may also check data about geographic features that are already in the primary database to assure that the data are correct and up-to-date. In order to perform these functions, the researchers may physically travel in the geographic area to observe the represented geographic features and attributes thereof. To perform this function efficiently, a researcher attempts to limit the number of excursions into the field to as few as possible and to make as many updates as possible while out in the field.

II. First Embodiment

Figure 3:
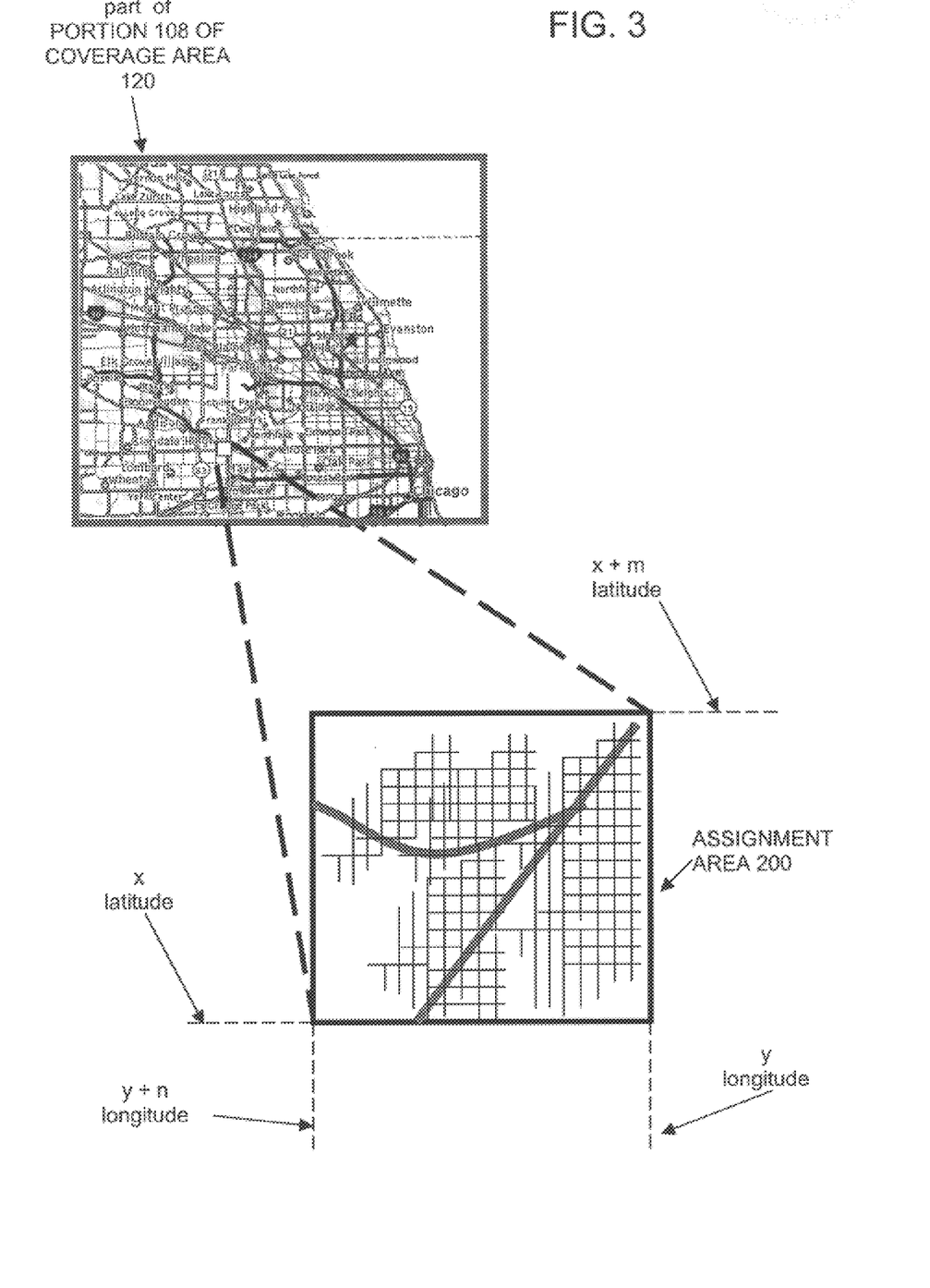
FIG. 3 is map illustrating an assignment area which is located in the coverage area shown in FIG. 1 and which contains geographic features about which new data will be collected for updating the primary version of the geographic database.

According to a first embodiment, the data collection activities of a researcher are organized into assignments. Referring to FIG. 3, each assignment is associated with an assignment area 200. The assignment area 200 is a physical geographic area that contains geographic features about which the researcher collects data for updating or expanding the primary version of the geographic database 100. The assignment area 200 is typically a relatively small portion of the coverage area 108. The assignment area 200 may be within the part 120 of the coverage area assigned to the field office.

The size of the assignment area 200 may depend upon various factors, such as the kinds of data being collected, the distance of the assignment area from the field office, the density of geographic features in the assignment area, and so on. For example, the assignment area 200 may be several square miles, or alternatively the assignment area 200 may be hundreds of square miles.

Some kinds of data collection can be performed at the location of the field office. For example, aerial maps may be examined to determine certain kinds of geographic features. However, other kinds of updating require that the researcher physically travel to the assignment area 200 to collect the data for updating or expanding the geographic database. The researcher may travel along the roads in the assignment area by car, but any other suitable mode of transportation may be used.

Updating Tool Program

Figure 4:
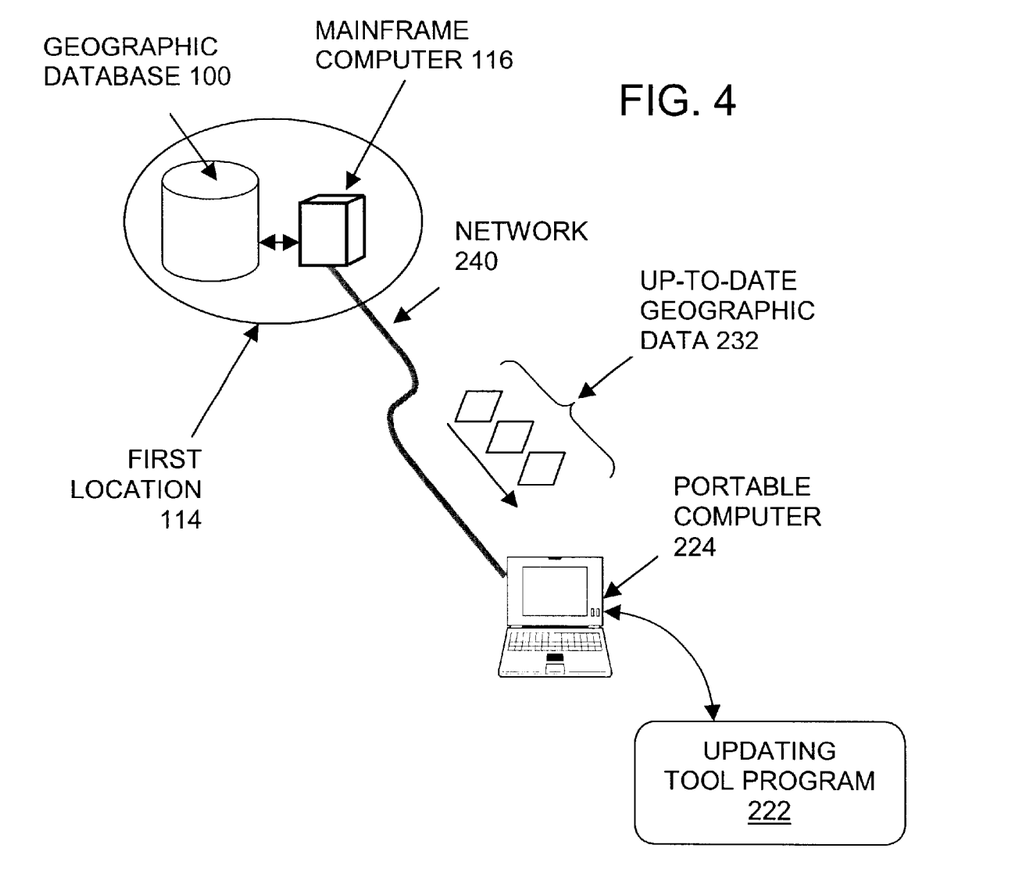
FIG. 4 is a diagram showing components of a system, including an updating program, used to update the primary version of the geographic database shown in FIG. 1.

Referring to FIG. 4, when performing the data collection assignment, the researcher uses an updating tool program 222. The updating tool program 222 is a software program. The updating tool program 222 includes a data acquisition component 250, a data collection component 260 and a data updating component 290. Each of these is described in further detail below. In one embodiment, the updating tool program is written in the C programming language. In alternative embodiments other programming languages may be used, such as C++, Java, Visual Basic, and so on.

The updating tool program 222 is installed on a portable computer 224, although in alternative embodiments some or all of the components of the updating tool program 222 may be installed on another computer, such as the main computer 116 or another computer on the network 242. The portable computer 224 (or the other computer platform) upon which the updating tool program 222 is installed includes the appropriate hardware and software so that data from the primary version of the database 100 can be loaded into it. According to one embodiment, the portable computer 224 connects to the network 240 at the field office to receive data from the main computer 116. Alternatively, the portable computer 224 can access the main computer 116 through any other kind of connection, such as a dial-up connection or a wireless connection.

Obtaining Read-only Data

Figure 5:
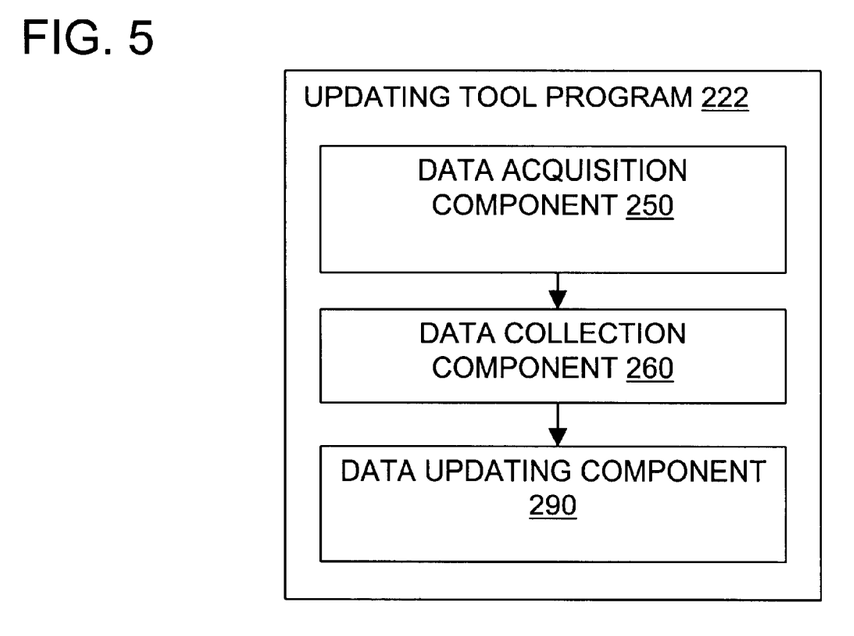
FIG. 5 is a block diagram illustrating the components of the updating tool program shown in FIG. 4.
Figure 6:
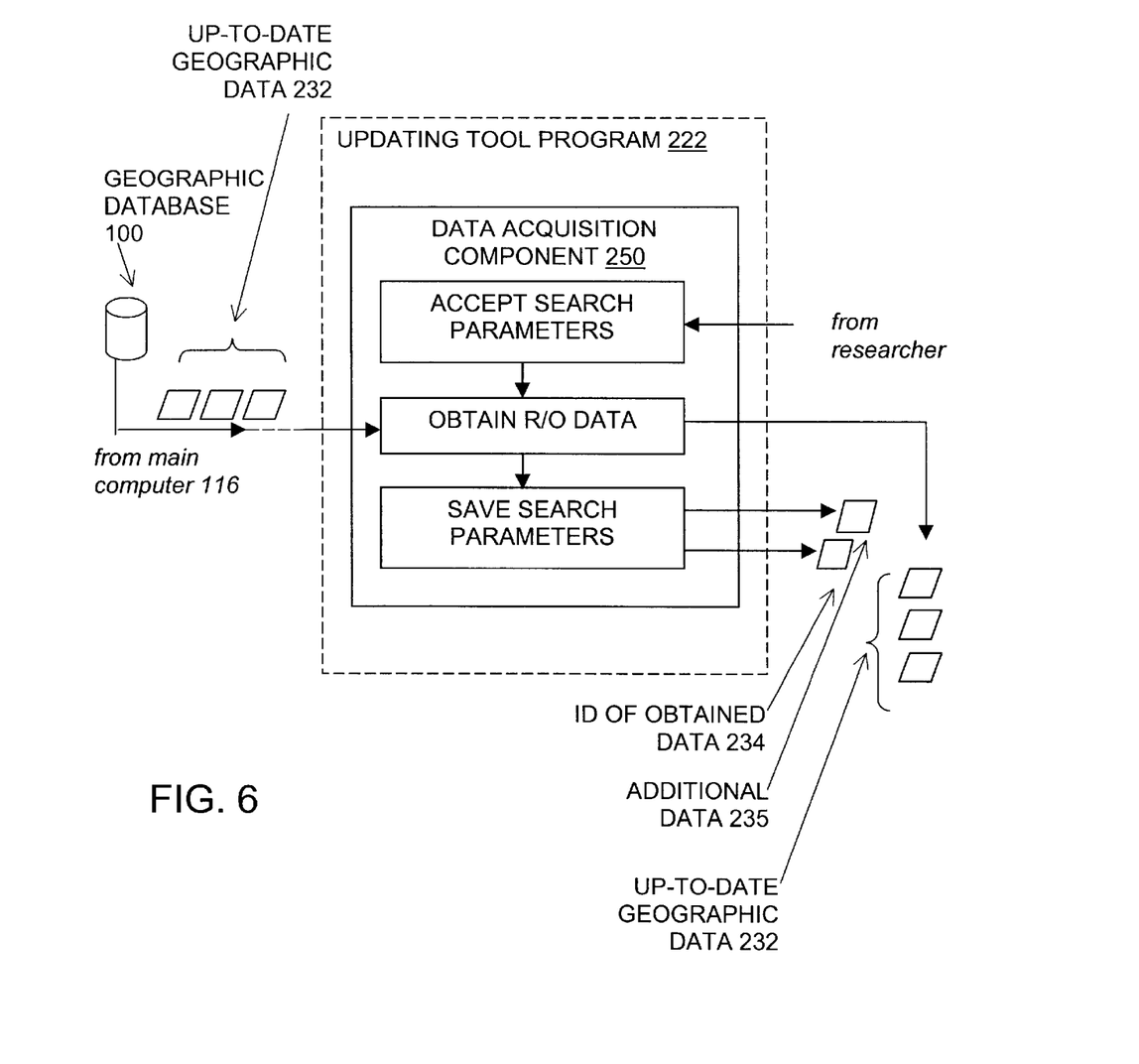
FIG. 6 is a block diagram of the data acquisition component of the updating tool program shown in FIG. 5.

Referring to FIGS. 5 and 6, the data acquisition component 250 of the updating tool program 222 is used to obtain a copy of the most up-to-date geographic data 232 that corresponds to the assignment area 200 (in FIG. 3). This copy 232 of up-to-date data is obtained from the primary version of the geographic database 100. The copy of the data 232 may be obtained by means of the network 240 that interconnects the main computer 116 at the location 114 of the primary database 100 and the computing equipment in the field offices 118.

As mentioned above, the data acquisition component 250 may be part of the updating tool program 222 or may be a standalone program. Alternatively, the data acquisition component 250 may be installed on the main computer 116 and run remotely from the portable computer 224.

The data acquisition component 250 may include appropriate menus and prompts that allow a researcher to specify the data corresponding to an assignment area using various kinds of parameters. For example, the data acquisition component 250 may allow the researcher to specify a rectangular area by geographic coordinates (e.g., x, x+m latitude and y, y+n longitude, as shown in FIG. 3). Then, the data acquisition component 250 obtains from the primary version 100 the data that represent all the geographic features encompassed within the specified rectangular area. The data acquisition component 250 may support other kinds of criteria and/or search parameters to define which data to obtain from the primary version of the geographic database. For example, data representing features within a circular area may be specified. Also, filters may be used. For example, the request may specify data representing only the controlled access roads within a specified set of geographic boundaries.

The copy of the data 232 obtained for the updating tool program 222 is obtained in read-only mode from the primary database 100. This means that when the copy 232 of the data is obtained from the primary database 100, no locks are applied in the primary database 100 to the copies of the data records that are provided to the updating tool program 222. Because no locks are applied to the data in the primary version of the database 100 that corresponds to the assignment area, any other researcher in any field office 118 may obtain, use, and/or modify the data corresponding to the assignment area.

When the read-only copy of the data 232 corresponding to the assignment area 200 is obtained, information 234 is stored that identifies the obtained data 232. The information stored 234 may include the parameters used to obtain the data from the primary version 100. For example, if all the data records are obtained that correspond to geographic features encompassed within an assignment area defined by the rectangle having the geographic boundaries x, x+m latitude and y, y+n longitude, data indicating the coordinates of this rectangle (e.g., x, x+m latitude and y, y+n longitude) are stored. The function of identifying the data obtained from the primary version of the geographic database may be performed by a routine within the data acquisition component 250. The information 234 that identifies the data 232 obtained from the primary version of the database may be stored as a data file on the portable computer 224, on the network 240, in the field office, at the main computer 116, or elsewhere.

In addition to storing data 234 that identify the acquired data 232, additional data may be stored. This additional data 235 may include a control ID, an ID of the researcher, the date and time that the data 232 was obtained, and so on. The control ID can be a unique number identifying the updating assignment. The ID of the researcher can be the name or employee number of the researcher. The storage of these additional items of data may also be performed by appropriate routines in the data acquisition component 250.

Collecting Updated Data

After the data 232 corresponding to the assignment area are stored on the portable computer 224 and the information 234 identifying the obtained data 232 are also stored, the researcher can undertake the collection of data in the assignment area. If necessary, the researcher travels to the assignment area. As mentioned above, the researcher typically travels by car, but other modes of transportation are also suitable. The researcher brings along the portable computer 224 with the updating tool program 222 and the downloaded data 232.

Figure 7:
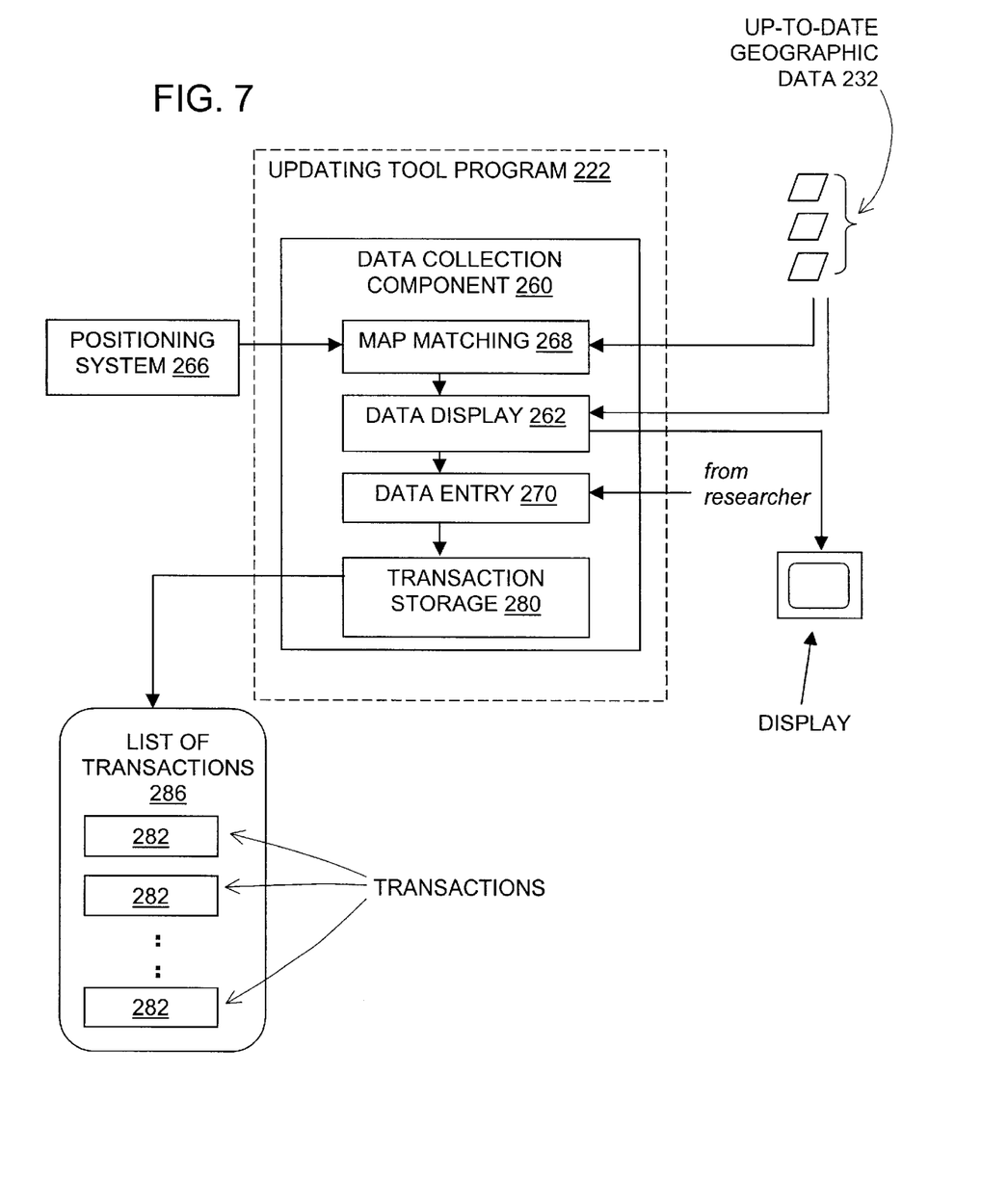
FIG. 7 is a block diagram of the data collection component of the updating tool program shown in FIG. 5.

The updating assignment may involve traveling along roads in the assignment area and observing geographic features and/or attributes thereof. As the researcher travels through the assignment area, he/she uses the data collection component 260 of the updating tool program 222. The data collection component 260 includes a data display function 262. The data display function 262 presents to the researcher (e.g., on a display screen of the portable computer) specific information from the data 232 relating to the assignment area. The display function 262 may present to the researcher one or more of the data records from the data 232 that represent the geographic features that the researcher can physically observe around him/her. The display function 262 may present entire copies of these data records or only portions thereof. Alternatively, the display function 262 may present the information graphically in the form of a map showing the area immediately around the researcher or which the researcher can physically observe. (Various kinds of map display programming may be used for this purpose. Programming to render and generate a map from geographic data are known to those of skill in the art.) If the information is shown graphically, selected attributes of the data entities that represent the displayed features may be overlaid on the illustrated map. For example, if the researcher is updating street names, the names of the streets may be shown on the illustrated map adjacent to the represented roads.

A positioning system 266 may be used to facilitate providing the researcher with the specific data that represent the geographic features around him/her. The positioning system 266 uses technology, such as GPS or dead-reckoning, to determine the geographic coordinates around the researcher. The positioning system 266 may be part of the portable computer 224, may be part of a navigation system installed in the vehicle in which the researcher is traveling or may be a standalone unit. The positioning system 266 provides data to map matching programming 268 (which may be part of the display function 262 or which may be a standalone program). The map matching programming 268 identifies those data records (or portions thereof) in the data 232 that represent geographic features that are physically close to the geographic coordinates of the positioning system. (Any suitable kind of map matching programming may be used. Map matching programming is known to those of skill in the art.) The map matching programming may be included as part of the updating tool 222.

In an alternative embodiment, the display function 262 can be used without a positioning system. If the display function 262 is used without a positioning system, the display function 262 provides an interface that allows the researcher to select a desired location manually (e.g., using a pointing device) by panning and zooming on a graphical map display of the assignment area. (Programming for providing this kind of functionality is known.)

In addition to showing to the researcher data that represent the geographic features around him/her, the data collection component 260 also includes a data entry function 270. This function 270 allows the researcher to make data entries. The data entries describe modifications to the copy 232 of data that is stored in the portable computer 224. The modifications may include adding a new data entity, changing (including adding, deleting, and/or modifying) the attributes of an existing data entity, or deleting a data entity. Examples of the kinds of modifications that can be entered are illustrated in the following examples.

EXAMPLE 1

The researcher may observe a road segment that is not represented by any data records among in the downloaded data 232. For example, while traveling in the assignment area, the researcher may physically observe a road, but notices that the map displayed on the personal computer 224 (which is generated from the data 232) omits the road. In this case, the researcher uses the data collection component 270 to add a new data entity record that represents the road segment. The researcher may also use the data collection component to add attributes for the new data entity, such as the geographic coordinates of the end points of the road segment, the address ranges along the road segment, the name of the road segment, etc.

EXAMPLE 2

The researcher may observe that information about a road segment already represented by existing data in the copy 232 is incorrect or incomplete. For example, the researcher may notice that the address range is incorrect, that the street has been renamed, that the speed limit has changed, or that a sign imposing a turn restriction has been erected. Another example is that parking along a road segment has been prohibited between certain hours of the day (e.g., a date-time modifier). In these cases, the researcher makes an entry that indicates a change to the appropriate attribute(s) of the existing data entity that represents the road segment.

EXAMPLE 3

The researcher may observe that a geographic feature represented in the copy 232 is gone. For example, the researcher may observe a point-of-interest icon that represents a restaurant on the graphical map image which is generated from the data 232 and displayed on the personal computer 224. However, the researcher may observe from his/her surroundings that the restaurant has closed. In this case, the researcher makes an entry using the data entry function 270 that deletes the point-of-interest data entity that represents the restaurant.

As the researcher travels through the assignment area, he/she uses the display function 262 and the data entry function 270 to identify the changes and additions that are necessary to make the data 232 more up-to-date. As the data entry function 270 accepts the modifications to the data 232, a transaction storage function 280 stores each of the modifications as a transaction 282. These transactions 282 are stored in a transaction data file 286 on the portable computer 224. The data file 286 stores the transactions 282 as a series of modifications to be made to the data 232. Each transaction 282 identifies the data entity affected and the kind of modification to be made to it. If the transaction 282 identifies a change of an attribute of an existing data entity (i.e., a data entity that already exists in the data 232 that represents a geographic feature), the attribute is identified and the change to the attribute is identified. For example, if the address range of a road segment is changed, the transaction 282 identifies the data entity that represents the road segment (e.g., by data entity ID), the attribute of the data entity being changed (e.g., "address range"), and the new data for the attribute (e.g., "2400–2499").

If the transaction 282 identifies the addition of a new data entity for representing a geographic feature heretofore not represented in the data 232, specific attributes for the new data entity may be entered. For example, if a new data entity is required to represent a road segment that is not already represented in the downloaded data 232, the coordinates of the end points of the road segment may be identified, the name of the road may be identified, the speed limit may be identified, and so on. The transaction function 280 may assign a temporary ID for the new data entity.

In one embodiment, each of the transactions 282 in the transaction file 286 may be identified by a transaction ID.

The researcher continues to use the data collection component 260 while collecting data until the field portion of the assignment is completed. The researcher may spend several minutes collecting data in the field or may spend several hours, several days, or several weeks collecting data in the field.

Updating the Primary Version

Figure 8:
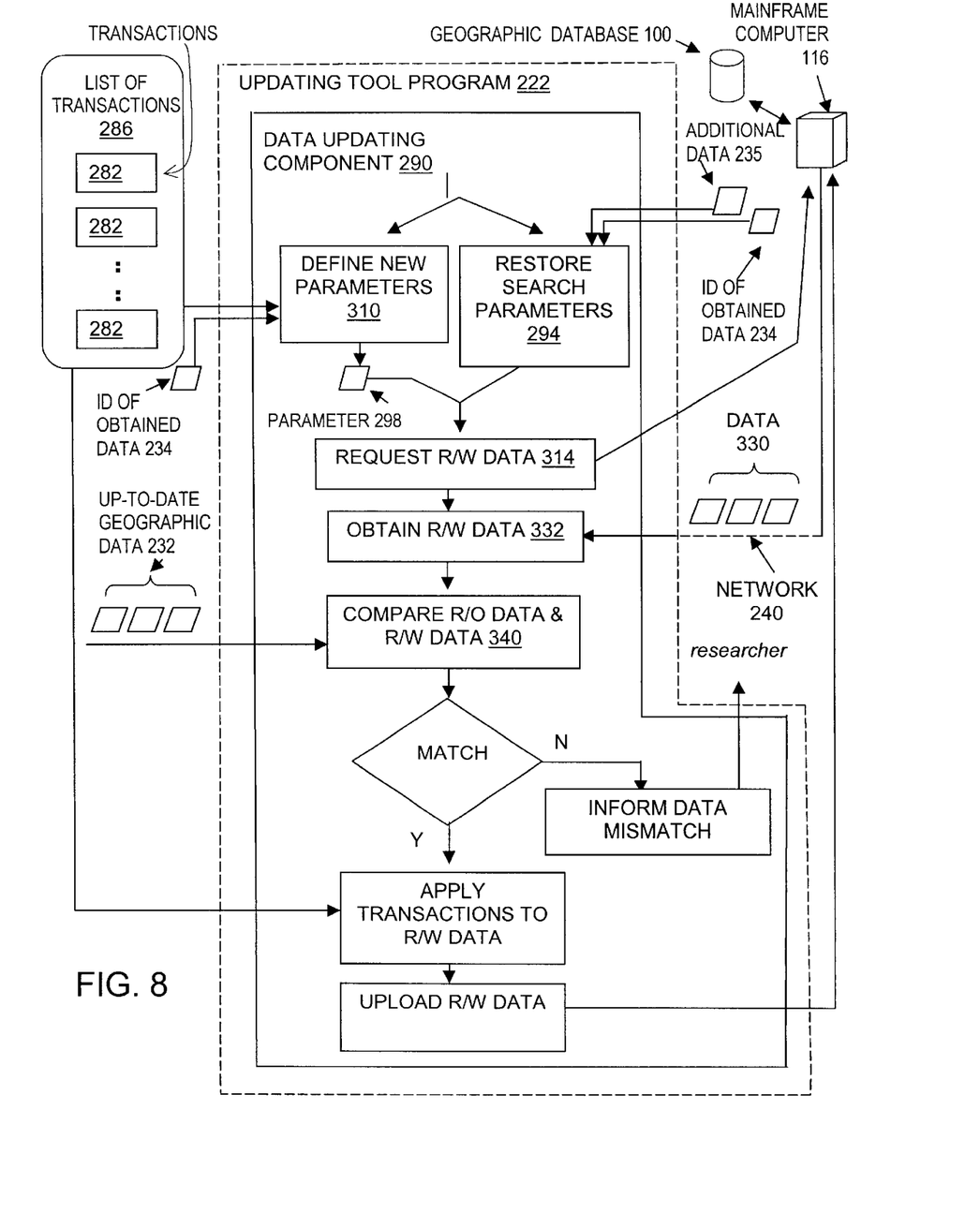
FIG. 8 is a block diagram of the data updating component of the updating tool program shown in FIG. 5.

After the researcher has finished collecting data in the assignment area, the changes included in the transaction file 286 can be applied to the primary version 100. In order to apply the changes to the primary version, the researcher uses the updating data component 290. As stated above, the updating data component 290 may be part of the updating tool program 222 or may be a standalone program. Alternatively, the updating data component 290 may be installed on the main computer 116 and run remotely from the portable computer 224.

When using the updating data component 290, data are obtained from the primary version 100 of the geographic database. To obtain data from the primary version of the database 100 the updating data component 290 uses a connection to the main computer 116. When using the updating data component 290, the researcher may return to the field office 118 and connect to the main computer 116 via the network 240. Alternatively, the researcher may use the updating data component 290 at any location at which data can be obtained from the primary version 100 of the geographic database. For example, the researcher may run the updating data component 290 with a dial-up connection to the main computer 116 or a wireless communications link. Thus, the researcher may run the data updating component 290 of the updating tool program 222 from out in the field.

According to one embodiment, the updating data component 290 uses the data 234 that identifies the read-only data 232 that had been previously downloaded from the primary version of the geographic database. The updating data component 290 may include a function 294 that restores this data 234. As mentioned above, the data 234 may include search parameters that specified the assignment area and that were used to obtain the copy of the data 232 that the researcher used while in the field. According to this alternative, the updating component 290 uses these same parameters 234 to obtain another copy of the data relating to the assignment area from the primary database 100. (The copy of data obtained is a read-write copy, which means that if the data is modified, the modifications will be saved in the primary version 100 of the geographic database.)

In an alternative embodiment, the updating data component 290 includes a function 310 that specifies new request parameters. Depending upon the kinds and number of updating modification entries made by the researcher when using the data collection component 260, it may be possible to identify new request parameters that specify a lesser amount of data than the data 232 that was previously obtained corresponding to the assignment area. The function 310 examines those portions of the previously downloaded data 232 that are affected by the modifications in the transaction file 286 and specifies new search parameters.

Figure 9A:
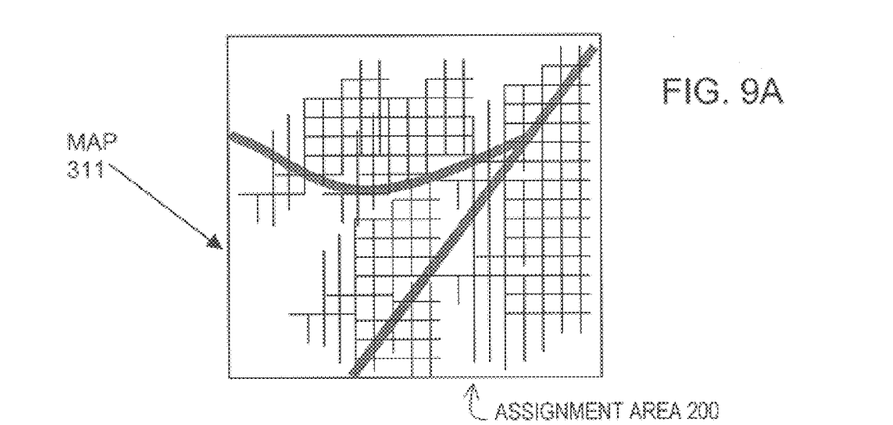
FIGS. 9A, 9B, and 9C show maps that illustrate a function that determines which data to request from the primary version of the geographic database.
Figure 9B:
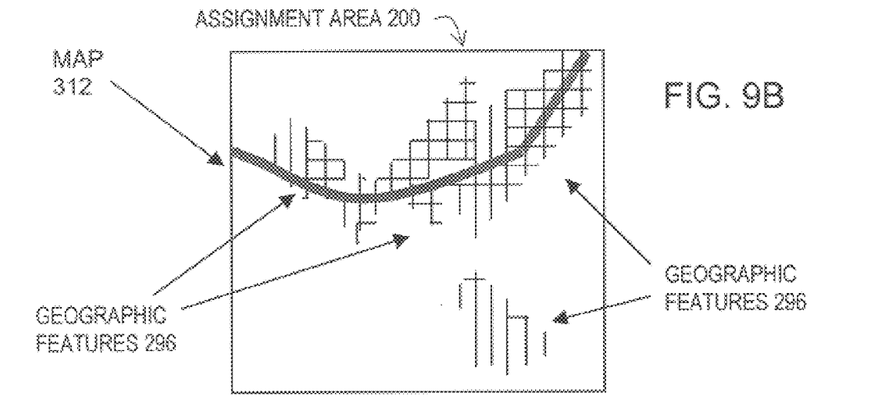
Figure 9C:
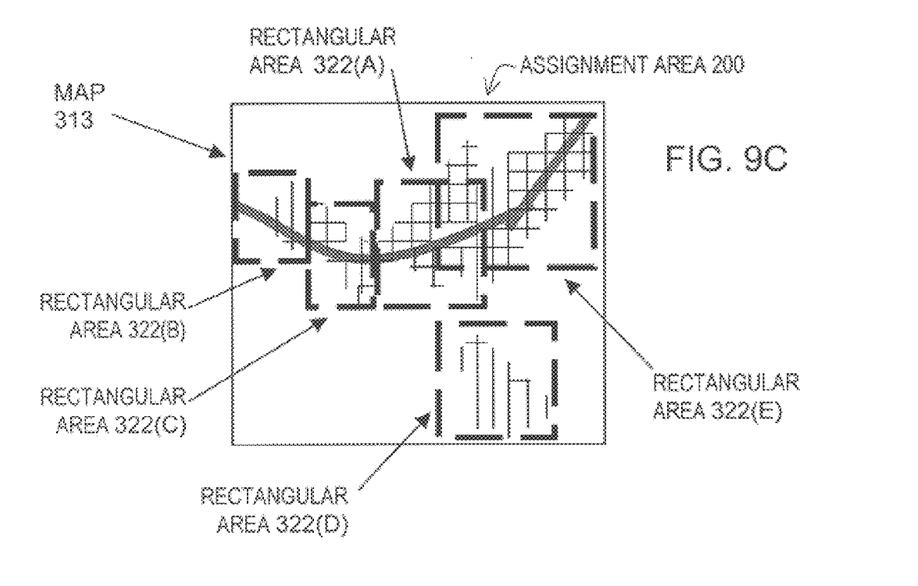

An example illustrating operation of the function 310 is shown in FIGS. 9A, 9B, and 9C. FIG. 9A shows a map 311 of the assignment area 200. The map 311 in FIG. 9A is similar to the map shown in FIG. 3. As described above, when the researcher was preparing to travel to the assignment area to collect data, then-current data 232 was obtained from the primary database version 100. This then-current data 232 represented all (or specified portions) of the geographic features located in the assignment area 200. After the researcher finished traveling through the assignment area 200 collecting new data, the transaction file 286 containing the new data in the form of a series of transactions 282 was produced.

FIG. 9B is a map 312 similar to FIG. 9A showing only the geographic features (labeled 296) in the assignment area 200 that are represented by data entities that are affected by the modifications in the transaction file 286. Using the information in the transaction file 286 and, optionally, the data 234 specifying the previously-requested data 232, the function 310 specifies new request parameters 298. The new request parameters 298 identify one or more portions of data to be requested from the primary database version. These new request parameters 298 include the data entities affected by the modifications in the transaction file 286. These new request parameters may identify smaller sub-areas located within the assignment area 200. These sub-areas contain the geographic features that are represented by data entities affected by modifications in the transaction file 286. The function 310 can use various techniques to determine these new sub-areas. These sub-areas may be defined by their boundary coordinates. These sub-areas may be rectangular or have any other shape. The boundary coordinates of these new sub-areas can be used as the new request parameters 298. Depending upon the kinds and number of updating modifications made by the researcher when using the data collection component 260, the sub-areas defined by the function 310 may identify a lesser amount of data than the data 232 that had originally been requested.

FIG. 9C illustrates specification of these sub-areas. FIG. 9C is a map 313 similar to the map shown in FIG. 9B. FIG. 9C shows rectangular sub-areas, 322(A), 322(B), 322(C), 322(D), and 322(E), defined within the assignment area 200. These rectangular areas completely encompass all the geographic features 296 that are represented by data entities that are affected by the updating transactions 282 in the transaction file 286. It is noted that the sub-areas may encompass some geographic features around those geographic features represented by data entities directly affected by the modifications. This assures that all the affected data entities are identified.

After the function 310 determines the new request parameters 298, these new request parameters 298 are used to request data from the primary version of the geographic database. The request would include all the data entities in the primary version of the geographic database that represent features encompassed within the rectangular areas 322(A), 322(B), 322(C), 322(D), and 322(E). The data entities that represent geographic features located within the assignment area 200 but outside all of the sub-areas would not be requested.

If the researcher has collected data from many locations widely dispersed throughout the assignment area 200, the function 310 may not be able to define sub-areas that include significantly fewer features than are included in the entire assignment area. In such a case, the original parameters 234 for the assignment area may be used.

Using either the new request parameters 298 defined by the function 310 or the original request parameters 234, the data updating component 290 requests data from the main computer 116. The data updating component 290 may include a function 314 that sends this request for data to the main computer 116. The request may be sent over the network 242.

In response to the request, the updating component 290 receives data 330 from the main computer. The updating component 290 may include a function 332 for this purpose. The data 330 corresponds to the request parameters (i.e., 234 or 298). This data 330 is provided to the researcher as read-write data. In other words, the data 330 can be modified by the researcher and the modifications will be saved in the primary version 100 of the geographic database. Further, while the researcher is working on the data 330, the corresponding data records in the primary version 100 of the database are locked, i.e., no one else can modify these data records.

When the updating component 290 receives the read-write data 330, it performs a check to determine whether the read-write data 330 substantially corresponds to the data 232 that had been obtained and used during the data collection process. (Programming 340 in the data updating component 290 performs this function.) Because the prior copy 232 of the data was obtained in read-only mode, no locks were applied to the downloaded data records. Since the time that the read-only copy 232 was obtained, minutes, hours, days or weeks may have elapsed. Thus, any other researcher could have subsequently downloaded or modified some or all of the same data records that were included in the data 232 provided to the researcher. Such subsequent modifications may have modified the data in a manner such that the new modifications cannot reliably be applied. If these types of modifications have been made, the comparison function 340 detects the changes by examining the originally downloaded read-only data 232 and the newly downloaded read-write data 330. The researcher is informed about the mismatch. The researcher may be provided with an opportunity to modify the data 330 or the transactions 282 to take into account the changes that had been applied subsequent to obtaining the read-only copy 232.

If a comparison of the newly downloaded read-write data 330 to the previously downloaded read-only data 232 reveals no substantial differences, the transactions 282 in the transaction file 286 are applied to the read-write data 330. The transactions 282 may be applied one-at-a-time or all at once. Integrity checks may be performed to assure that the modifications are valid.

The comparison between the read-only data 232 and the read-write data 330 may tolerate some differences between the read-only copy 232 and the read-write copy 330. Some differences may be relatively minor or may affect portions of the data that are not related to the transactions in the transaction file 286. For example, the transactions 286 in the transaction file 286 relate to changes in street address ranges and the changes that had been made to the primary version of the geographic database may relate to postal zones. These kinds of differences may be treated as unrelated. Under these circumstances, the comparison function 340 will not necessarily prevent applying the modifications in the transaction file 286 to the read-write data 330. The comparison function 340 may inform the researcher about the differences and provide the researcher an opportunity to review or reject application of the transactions in the transaction file 286.

If the previously downloaded read-only data 232 does not exactly match the subsequently obtained read-write data 330, the comparison function 340 may be applied on a transaction-by-transaction basis. Those transactions 282 in the transactions file 286 that relate to data entities that had not been substantially modified (since the read-only copy 232 was obtained) may be applied. Those transactions 282 that relate to data records that have been substantially modified since the read-only data 232 was obtained are not applied. The transactions that are not applied may be stored in a log file for review by the researcher. The researcher may be able to review these logged transactions and modify them in a manner so that they can be applied without travelling out into the field again.

Logging of the application of the transactions to the read-write copy 330 of the data may be performed, as appropriate.

Advantages of the Data Collection Method and System

The disclosed embodiments provide advantages over prior known methods for collecting data for updating a geographic database. A researcher can make editing changes to a copy of the data from the primary database while out in the field. This saves the extra steps of marking the changes on a printed copy of a map and then entering the changes from the printed copy of the map into a read-write copy. Also, because the edits are made to the read-only copy and not to the read-write copy, the researcher is shielded from crashes that might occur on the mainframe. Embodiments of the disclosed system and method allow the researcher to spend more time in the field collecting data, thereby potentially increasing efficiency. Disclosed embodiments allow more than one researcher to work on data relating to the same geographic area. This permits greater flexibility in scheduling data collection assignments for researchers, potentially leading to greater efficiency. Still another advantage is that the updating program tolerates changes made by a second researcher to the data in the primary copy after a read-only copy is obtained by a first researcher if the changes do not conflict with modifications collected by the first researcher. Another advantage of the disclosed system and method is that the data in the primary version of the geographic database is locked for shorter periods of time. A further advantage provided by an embodiment is that changes made to the primary version of the database since the time that a researcher commenced an updating project can be identified and stored in a transaction log. There may be other advantages of the disclosed method and system in addition to these.

III. Further Alternatives

In one alternative embodiment, instead of taking the updating program on a portable computer out into the field, the researcher can use the updating program at the field office. According to this embodiment, before the researcher travels out to the assignment area, he/she uses the updating program to obtain a first (i.e., read-only) copy of data. Then, a printed copy of a map of the assignment area is generated using the first copy of data. The map may be printed at the field office or may be provided from another location. The printed copy of the map may include details about represented geographic features, such as streets, address ranges, turn restrictions, street names, points-of-interest, and so on.

According to this embodiment, the researcher travels through the assignment area. While in the assignment area, the researcher observes geographic features and marks changes directly on the printed map. Then the researcher returns to the field office. At the field office, the researcher runs the updating program and applies the changes to the read-only copy of the data using the marked map as a guide. As the researcher applies the changes, a transaction file is created, as in the first described embodiment. Then, the researcher obtains a read-write copy of data, as in the first embodiment, and confirms that the changes in the transaction file can be applied to the read-write copy, as in the first embodiment.

This latter embodiment provides advantages that are similar to those provided by the first embodiment. According to this latter embodiment, the researcher may work with a printed map in the field, which may be more convenient for collecting certain kinds of data. This latter embodiment provides the advantage that more than one researcher can be working on data relating to the same geographic features. This embodiment also reduces the amount of time that the data in the primary copy of the geographic database is locked.

In this embodiment if the updating program is used at the location of the field office, the updating program may be installed on a non-portable (e.g., desktop) computer which is connected to the network.

With another alternative version of this embodiment, the updating program is not necessarily run at the location of the field office. Instead, the researcher may run the updating program while out in the field. For example, after the researcher travels for several hours marking changes on a printed map, he/she uses a portable computer to run the updating program and store the changes in a transaction file. The researcher can ran the updating program from an automobile, from a motel room, or any other location. The updating program can be installed on a personal computer that the researcher takes out into the field or alternatively the updating program can be installed on another computer and run remotely from a portable computer that the researcher takes into the field.

As mentioned above, in one embodiment the updating tool program uses a copy of the most up-to-date geographic data that corresponds to the assignment area. In an alternative embodiment, the updating tool program may use a copy of the geographic data that corresponds to an area larger than the assignment area. The updating tool may use a copy of the geographic database that corresponds to the region 120 associated with the field office, or even to the entire coverage area 108.

It is intended that the foregoing detailed description be regarded as illustrative rather than limiting and that it is understood that the following claims including all equivalents are intended to define the scope of the invention.

We claim:

1. A data collection method for a geographic database that represents geographic features in a region, the method comprising:

obtaining a first copy of data from the geographic database;

performing an updating process using said first copy;

obtaining a second copy of data from the geographic database;

determining whether application to the second copy of data from the geographic database of the updating process performed using the first copy of data from the geographic database conflicts with any changes made to the geographic database since the first copy of data was obtained from the geographic database; and applying the updating process to the second copy of data from the geographic database if said determining step determines no intolerable conflict.

2. The method of claim 1 wherein the first copy of data is a read-only copy.

3. The method of claim 1 wherein the second copy of data is a read-write copy.

4. The method of claim 1 wherein the first copy of data includes data entities that represent geographic features encompassed within an assignment area defined as a relatively small part of the region represented by the geographic database.

5. The method of claim 1 further comprising the steps of:

prior to obtaining the second copy of data, examining the updating process and determining a request that includes the data affected by the updating process; and using said request when obtaining said second copy of data from the geographic database.

6. The method of claim 1 wherein the steps of obtaining a first copy, performing an updating process, obtaining a second copy, determining, and applying are performed using a computer program.

7. The method of claim 6 wherein the computer program is installed on a portable computer that a researcher brings along while traveling in a portion of the region containing geographic features represented by the first copy of data.

8. The method of claim 1 wherein the step of performing an updating process is performed using a computer program installed on a portable computer, and wherein the method further comprises the steps of:

traveling in a portion of the region containing geographic features represented by the first copy of data;

bringing the portable computer with the computer program installed thereon while traveling in said portion of the region; and performing the updating process using the computer program while traveling in the portion of the region containing geographic feature represented by the first copy of data.

9. The method of claim 1 further comprising the step of;

locking the data in the geographic database corresponding to the second copy of data during the steps of obtaining the second copy of data, determining, and applying.

10. The method of claim 1 wherein the first copy of data represent geographic features encompassed within a rectangular area defined within the region covered by the geographic database.

11. The method of claim 1 further comprising the steps of:

storing data that indicate the first copy of data obtained from the geographic database; and using said stored data that indicate the first copy when performing the step of obtaining the second copy of data from the geographic database.

12. The method of claim 1 wherein the step of performing an updating process comprises:

determining a series of transactions that define changes to the first copy of data from the geographic database.

13. The method of claim 12 further comprising the step of:

saving said series of transactions in a data file on a portable computer brought along to a portion of the region containing geographic features represented by said first copy of data.

14. The method of claim 12 wherein the step of applying further comprises:

applying said series of transactions to the second copy of data.

15. The method of claim 1 further comprising:
observing geographic features while traveling in a portion of the region containing geographic features represented by said first copy of data; and
determining a series of transactions that define changes to the first copy of data in order to conform to said observed geographic features.

16. The method of claim 1 wherein the updating process includes changing attributes of data entities that represent roads.

17. The method of claim 16 wherein the attributes being changed include at least one of a speed limit along a road segment, a turn restriction at an intersection of roads, and a date-time modifier relating to a road segment.

18. The method of claim 1 wherein the updating process includes adding data entities to represent roads that are not already represented in the geographic database.

19. The method of claim 1 further comprising the step of:
displaying a graphical map image generated from the first copy of data while performing the updating process.

20. The method of claim 1 further comprising the step of displaying a graphical map image generated from the first copy of data while performing the updating process and while traveling in a portion of the region containing geographic features represented by the first copy of data.

21. The method of claim 20 further comprising the steps of:
obtaining geographic coordinates of a present position while travelling in said portion of the region; and
using said geographic coordinates to display in said graphic map image geographic features represented by data in said first copy of data located around said geographic coordinates.

22. A data collection method for a geographic database that represents geographic features in a region comprising:
obtaining a first copy of data from the geographic database;
performing an updating process using said first copy;
accessing a second copy of data from the geographic database;
determining whether application to the second copy of data from the geographic database of the updating process performed using the first copy of data from the geographic database conflicts with any changes made to the geographic database since the first copy of data was obtained from the geographic database; and
if application of the updating process to the second copy of data would conflict with changes made to the geographic database since the first copy of data was obtained, providing an indication thereof,
otherwise, applying the updating process to the second copy of data from the geographic database.

23. The method of claim 22 further comprising the step of:
travelling through a portion of the region represented by the first copy of data;
while travelling, marking changes on a printed map of the portion of the geographic region represented by the first copy of data; and
using said changes marked on said printed map to perform the updating process on said second copy of data.

24. The method of claim 22 wherein the step of determining tolerates changes applied to the geographic database since the first copy of data was obtained if said changes do not affect data identified in the updating process as requiring modification.

25. The method of claim 22 wherein the step of determining tolerates changes applied to the geographic database since the first copy of data was obtained if said changes do not conflict with modifications identified in the updating process.

26. A data collection method for a geographic database, wherein the geographic database represents geographic features in an entire region, the method comprising:
obtaining a read-only copy of a portion of a geographic database, wherein the read-only copy includes data that represent geographic features encompassed in a portion of the geographic region defined within first boundaries;
observing geographic features encompassed in said portion of the geographic region defined within said first boundaries;
performing an updating process using data in said read-only copy;
accessing a read-write copy of a portion of the geographic database, wherein the read-write copy includes data that represent at least some of the features represented by the data in the read-only copy;
determining whether application to the read-write copy of the portion of the geographic database of the updating process performed on the data in the read-only copy conflicts with any changes to the geographic database effected since the read-only copy was obtained; and
applying the updating process to the read-write copy of the portion of the geographic database if the determining step confirms that no changes made to the geographic database since the read-only copy was obtained will conflict with the updating process.

27. The method of claim 26 further comprising the step of:
after performing the updating process upon data in said read-only copy, determining a minimum portion of said geographic database required to be obtained in order to apply the updating process;
and further wherein the portion of the geographic database in said read-write portion is smaller than the portion of the geographic database in said read-only portion.

28. The method of claim 26 wherein the portion of the geographic database in said read-write copy represents features encompassed within second boundaries, wherein said second boundaries encompass at least one area within the area encompassed by the first boundaries.

29. The method of claim 26 further comprising the step of:
after performing the updating process upon data using said read-only copy, determining an optimized portion of said geographic database required to be accessed in order to apply the updating process.

30. The method of claim 26 further comprising the step of:
travelling through the portion of the geographic region defined within said first boundaries;
while travelling, marking changes on a printed map of the portion of the geographic region defined within said first boundaries; and
using said changes marked on said printed map to perform the updating process on said read-only copy.

31. The method of claim 26 further comprising the step of:
travelling through the portion of the geographic region defined within said first boundaries;
while travelling, storing changes on a computer-readable medium;
using said changes stored on the computer-readable medium to perform the updating process on said read-only copy.

32. The method of claim 26 wherein the step of obtaining a read-only copy of a portion of a geographic database further comprises:

specifying a first set of parameters that define the read-only copy of the portion of the geographic database; and saving the first set of parameters in a computer; and wherein the step of accessing a read-write copy of a portion of the geographic database further comprises:

using said first set of parameters to define the read-write copy of the portion of the geographic database.

33. A data collection method for a geographic database that represents geographic features in a region comprising:

obtaining a first read-only copy of a portion of a geographic database, wherein the first read-only copy includes data that represent geographic features encompassed in a portion of the geographic region defined within first boundaries;

using said first read-only copy of a portion of a geographic database, performing a first updating process upon data using said first read-only copy;

obtaining a second read-only copy of a portion of a geographic database, wherein the second read-only copy includes data that represent geographic features encompassed in a portion of the geographic region defined within second boundaries, wherein the second boundaries encompass at least a portion of the geographic area encompasses within the first boundaries;

using said second read-only copy of a portion of a geographic database, performing a second updating process upon data in said second read-only copy;

obtaining a first read-write copy of a portion of the geographic database, wherein the first read-write copy includes data that represent at least some of the features represented by the data in the first read-only copy upon which the first updating process was performed;

applying the first updating process to the first read-write copy of the portion of the geographic database;

obtaining a second read-write copy of a portion of the geographic database, wherein the second read-write copy includes data that represent at least some of the features represented by the data in the second read-only copy upon which the second updating process was performed;

determining whether application to the second read-write copy of the portion of the geographic database of the second updating process performed on the data in the second read-only copy conflicts with changes resulting from application of the first updating process;

if the determining step indicates no conflicts, applying the second updating process to the second read-write copy of the portion of the geographic database, and saving the second read-write copy with the second updating process applied thereto back to the geographic database.

34. The method of claim 33 wherein the first read-only copy of a portion of a geographic database is obtained by a first researcher and wherein said second read-only copy of a portion of a geographic database is obtained by a second researcher.

35. The method of claim 34 wherein said first updating process is performed by said first researcher and wherein said second updating process is performed by said second researcher.

36. A computer program used for updating a geographic database that represents geographic features in a region, wherein the computer program comprises:

a first routine that obtains a first copy of data from the geographic database;

a second routine that performs an updating process using said first copy;

a third routine that obtains a second copy of data from the geographic database;

a fourth routine that determines whether application of the updating process to the second copy of data conflicts with any changes made to the geographic database since the first copy of data was obtained from the geographic database; and a fifth routine that applies the updating process to the second copy of data from the geographic database if the fourth routine determines that there are no intolerable conflicts.

37. The computer program of claim 36 wherein said first, second, third, fourth, and fifth routines are installed on a portable computer.

38. The computer program of claim 36 wherein said first, second, third, fourth, and fifth routines are installed on a network.

39. The computer program of claim 36 further comprising a sixth routine that communicates with a remote computer from which the first and second copies of data are obtained.

40. The computer program of claim 36 wherein said first, second, third, fourth, and fifth routines are installed on a portable computer and further comprising:

a positioning system that determines geographic coordinates of a current position;

programming installed on said portable computer that matches said geographic coordinates determined by the positioning system to corresponding data from the first copy of the geographic database; and programming installed on said portable computer that displays said corresponding data on a display of said portable computer.

* * * * *